United States Patent
Cho et al.

(10) Patent No.: US 8,073,036 B2
(45) Date of Patent: Dec. 6, 2011

(54) BEAM STABILIZED FIBER LASER

(75) Inventors: Gyu C. Cho, Ann Arbor, MI (US); Oleg Bouevitch, Nepean (CA)

(73) Assignee: Imra America, Inc., Ann Arbor, MI (US)

( * ) Notice: Subject to any disclaimer, the term of this patent is extended or adjusted under 35 U.S.C. 154(b) by 0 days.

(21) Appl. No.: 12/966,603

(22) Filed: Dec. 13, 2010

(65) Prior Publication Data

US 2011/0103408 A1     May 5, 2011

Related U.S. Application Data

(63) Continuation of application No. 11/727,500, filed on Mar. 27, 2007, now Pat. No. 7,885,311.

(60) Provisional application No. 60/578,875, filed on Jun. 14, 2004.

(51) Int. Cl.
*H01S 3/091*     (2006.01)
*H01S 3/092*     (2006.01)
*H01S 3/30*     (2006.01)

(52) U.S. Cl. ............................. 372/71; 372/6; 372/107

(58) Field of Classification Search .................. 372/71, 372/6, 107
See application file for complete search history.

(56) References Cited

U.S. PATENT DOCUMENTS

| | | | |
|---|---|---|---|
| 4,306,771 A | 12/1981 | Bjorklund | |
| 5,270,791 A | 12/1993 | Lefevre | |
| 5,483,508 A | 1/1996 | Miyake | |
| 5,656,186 A | 8/1997 | Mourou | |
| 5,659,560 A | 8/1997 | Ouchi | |
| 5,696,782 A * | 12/1997 | Harter et al. | 372/25 |
| 5,719,372 A | 2/1998 | Togari | |
| 5,756,924 A | 5/1998 | Early | |
| 5,761,111 A | 6/1998 | Glezer | |
| 5,911,891 A | 6/1999 | Dulaney | |
| 5,969,851 A * | 10/1999 | Clark et al. | 359/345 |
| 6,324,195 B1 | 11/2001 | Suzuki | |
| 6,399,914 B1 | 6/2002 | Troitski | |
| 6,462,307 B1 | 10/2002 | Hennig | |
| 6,528,762 B2 | 3/2003 | Mayer | |
| 6,541,731 B2 | 4/2003 | Mead | |
| 6,570,704 B2 | 5/2003 | Palese | |
| 6,664,498 B2 | 12/2003 | Forsman | |
| 6,727,458 B2 | 4/2004 | Smart | |
| 6,760,356 B2 | 7/2004 | Erbert | |
| 6,777,645 B2 | 8/2004 | Ehrmann | |
| 6,809,291 B1 | 10/2004 | Neil | |
| 6,875,950 B2 | 4/2005 | Naumov | |

(Continued)

FOREIGN PATENT DOCUMENTS

EP     00937533 A1     8/1999

(Continued)

OTHER PUBLICATIONS

Sattmann et al., "Laser-induced breakdown spectroscopy of steel samples using multiple Q-switch Nd:YAG laser pulses", R. Sattmann, J. Phys. D: Appl. Phys. 28, (1995)p. 2181-2187.

(Continued)

*Primary Examiner* — Patrick Stafford
(74) *Attorney, Agent, or Firm* — Sughrue Mion, PLLC (57) ABSTRACT

A laser head generating ultrashort pulses is integrated with an active beam steering device in the head. Direct linkage with an application system by means of an adequate interface protocol enables the active device to be controlled directly by the application system.

15 Claims, 9 Drawing Sheets

U.S. PATENT DOCUMENTS

| | | |
|---|---|---|
| 7,115,514 B2 | 10/2006 | Stoltz |
| 7,684,450 B2 | 3/2010 | Shah |
| 2002/0125227 A1 | 9/2002 | Sun |
| 2002/0137311 A1 | 9/2002 | Timans |
| 2002/0167581 A1 | 11/2002 | Cordingley |
| 2003/0025911 A1 | 2/2003 | Walmsley |
| 2003/0151033 A1 | 8/2003 | Shepherd |
| 2003/0151053 A1 | 8/2003 | Sun |
| 2003/0196995 A1 | 10/2003 | Jennings |
| 2003/0205561 A1 | 11/2003 | Iso |
| 2003/0216012 A1 | 11/2003 | Sasaki |
| 2004/0053480 A1 | 3/2004 | Tanabe |
| 2004/0134896 A1 | 7/2004 | Gu |
| 2004/0165637 A1 | 8/2004 | Bullington |
| 2004/0214411 A1 | 10/2004 | Yamazaki |
| 2004/0231682 A1 | 11/2004 | Stoltz |
| 2004/0236228 A1 | 11/2004 | Stoltz |
| 2005/0035097 A1 | 2/2005 | Stoltz |
| 2005/0038487 A1 | 2/2005 | Stoltz |
| 2005/0041976 A1 | 2/2005 | Sun |
| 2005/0065502 A1 | 3/2005 | Stoltz |
| 2005/0067388 A1 | 3/2005 | Sun |
| 2005/0074974 A1 | 4/2005 | Stoltz |
| 2005/0077275 A1 | 4/2005 | Stoltz |
| 2005/0167405 A1 | 8/2005 | Stoltz |
| 2005/0171516 A1 | 8/2005 | Stoltz |
| 2005/0177143 A1 | 8/2005 | Bullington |
| 2005/0205778 A1 | 9/2005 | Kitai |
| 2005/0215985 A1 | 9/2005 | Mielke |
| 2005/0218122 A1 | 10/2005 | Yamamoto |
| 2005/0226287 A1 | 10/2005 | Shah |
| 2005/0260677 A1 | 11/2005 | Saaski |
| 2006/0064079 A1 | 3/2006 | Stoltz |
| 2006/0084957 A1 | 4/2006 | Delfyett |
| 2006/0113375 A1 | 6/2006 | Caiger |
| 2006/0131288 A1 | 6/2006 | Sun |
| 2006/0192845 A1 | 8/2006 | Cordingley |
| 2006/0210275 A1 | 9/2006 | Vassie |
| 2007/0020785 A1 | 1/2007 | Bruland |
| 2007/0106416 A1 | 5/2007 | Griffiths et al. |
| 2007/0121686 A1 | 5/2007 | Vassie |

FOREIGN PATENT DOCUMENTS

| | | |
|---|---|---|
| EP | 1260838 A2 | 11/2002 |
| JP | 2001-326190 A | 11/2001 |
| WO | 03097290 | 11/2003 |
| WO | 2004/105100 A3 | 12/2004 |
| WO | 2004-114192 A1 | 12/2004 |
| WO | 2004/114473 A2 | 12/2004 |
| WO | 2004107510 | 12/2004 |
| WO | 2005/018061 A2 | 2/2005 |
| WO | 2005/018063 A2 | 2/2005 |
| WO | 2005037478 | 4/2005 |
| WO | 2005/101592 | 10/2005 |
| WO | 2005099957 | 10/2005 |
| WO | 2007-143408 A2 | 12/2007 |

OTHER PUBLICATIONS

"Introduction to Modern Optics", G. R. Fowles, second edition, Optics Physical, 1975, pp. 44-45.

\* cited by examiner

TIR-PSD performance: 1.6 mm beam @ 1040-1060nm

BEAM STABILIZED FIBER LASER

CROSS-REFERENCE TO RELATED APPLICATION

This application is a Continuation of U.S. application Ser. No. 11/727,500 filed Mar. 27, 2007, which is related to Provisional Application No. 60/578,875 filed Jun. 14, 2004; the disclosures of which are incorporated herein by reference.

BACKGROUND OF THE INVENTION

1. Field of the Invention

The present invention is related to a method for stabilization of the geometric optical beam path of a laser head for the application of precision laser material processing.

2. Description of the Related Art

Controlling the beam path out of a light source is crucial for an optical system. A precision laser processing system requires a precise guidance of the laser beam from the laser head to the target material to be processed. The accuracy will usually determine the precision of the processing. The most common cause of error is the change in the beam path due to a thermally induced opto-mechanical change in the properties of the material used. For a laser cavity or an amplifier, this change can even result in failure of the laser operation or instability in laser performance.

A passive method can be adopted by carefully choosing the optics and opto-mechanical materials, but this will not be a sufficient solution for most precision applications. On the other hand, keeping the temperature stable requires adequate heat control over the entire application system. Such a method often requires expensive and time-consuming maintenance and is not applicable for many laser application systems. Solid-state lasers generating ultrashort pulses e.g., <100 ps, require a constant temperature of the head in order to keep the laser cavity and amplifier in a stable opto-mechanical condition. Moreover, the beam delivery path from the light source to the target material to be processed needs to be taken care of separately.

Laser technology has moved toward alternative design solutions avoiding such temperature control. Fiber-based laser technology is promising in this regard. Indeed, the extreme sensitivity of thermo-optical stability of solid-state lasers has been recognized as a major barrier to the acceptance of short or ultrashort pulse lasers by industry. An active stabilization method is a more viable solution for most laser applications for controlling beam delivery. Prior art known in the precision laser machining community includes devices for beam steering between the laser head and the target material to be processed.

The laser-equipped CNC machine tool in U.S. Pat. No. 6,528,762 B2 automatically maintains precise beam path alignment upon a temperature variation of the environment. For beam control in a laser cavity, U.S. Pat. No. 5,969,851 discloses a method comprising active beam steering in combination with position sensors for the pump laser beam stabilization. In this disclosure the applicable concept is to keep the gain volume in a laser medium overlapped geometrically with the intracavity beam. The parameter for the active beam control is the laser head performance such as the output power, but the geometric beam path out of the laser head cannot be controlled.

From the application system point of view, it is a desirable to use a laser head integrated with beam delivery controlled directly by the application control device. By doing so, design flexibility can be provided to the application designer.

Furthermore, development of optical control devices implemented within a limited physical space is important for viable realization of active beam control. A device utilizing angular sensitivity of total internal reflection can be a solution. A polarization sensitive detection of angular beam movement in reflection or refraction is another solution when laser noise cancellation is critical to enhance detection sensitivity.

Fiber-based laser technology is promising in terms of low maintenance cost, beam quality, high energy efficiency and flexibility of implementation on the manufacturing floor. Regarding beam path control, the advantage of a fiber laser is its inherent thermo-mechanical stability of the beam path in the cavity in comparison to a free-space solid-state laser. The beam path is confined in the fiber and temperature variations cannot change the beam path. The temperature influence on the optical couplers can also be minimized by fusing the fibers of separate components required in the fiber laser, or using miniature fiber-pigtailed optics. No rigorous control of the temperature of the laser system is required except for the pumping source of the gain fiber. Only beam delivery outside the laser cavity to the user target needs to be addressed.

SUMMARY OF THE INVENTION

This invention discloses a laser head generating ultrashort pulses integrated with an active beam steering device in the head. Direct linkage with an application system by means of an adequate interface protocol enables the active device to be controlled directly by the application system.

No additional dedicated device for beam delivery stabilization between the laser head and the material to be processed can be a great benefit. Even if a position sensor is chosen to be located close to the material to be processed, the physical location of an active beam steering device in the laser head will be of advantage for increased angular sensitivity due to extended geometric distance.

For the implementation of the position sensitive sensor into a restricted space and/or for the increased angular sensitivity of beam direction, internal total reflection and polarization sensitive detection are applied. This applies to the case where the beam path variation is dominated by angular movement of the optics and optics holder.

Moreover, active steering of mirrors in a pulse compressor stage of a fiber laser is disclosed to be an exemplary embodiment of the disclosure.

For the control algorithm, depending on specific applications, the active beam alignment in the laser head needs to be coordinated with the application system controller in order to avoid interference or unexpected mistuning between the two control systems. This invention includes an active beam stabilization method where the beam stabilization circuit in the laser head is subject to commands from the master control system of the application system.

BRIEF DESCRIPTION OF THE DRAWINGS

after beam delivery (300) physically close to the material to be processed (402). A higher position accuracy of control can be achieved in this way. In such a case the communication can be made between the sensor B (404) and application system controller (400) whereas the position data is transferred to the laser head electronics controller (105) via communication interface (301).

FIG. 3 is a diagram showing an exemplary device for the position sensitive sensor (210). The detector can be a semiconductor photo diode generating a photo signal, i.e., current or voltage. It has partitions of multiple number, in this case four, in order to register the photo signal of beam spot (211) distributed over the detector area.

FIG. 6 is a diagram showing an exemplary embodiment of an angle-sensitive optical sensor. The incident beam (212) is separated into two polarization components using a polarizing beam splitter (241). Both components undergo internal total reflection in prism (243, 244) hitting-photodetector (245, 246). The leakage or transmitted light out of the prism is measured by photodetector (245, 246) as well.

FIG. 11 shows a diagram of an exemplary embodiment of the active beam steering method in a pulse compressor. One or multiple number of the mirrors used in the compressor can be actively controlled by actuators in combination with one or two position sensor(s) (109). The actuators and position sensor are linked to the electronic controller (105) where the data from the sensor is processed and a command signal is fed to the actuator driver, which controls the motion of the actuators.

DESCRIPTION OF THE PREFERRED EMBODIMENTS

In general a laser application system comprises a laser head, laser head controller, delivery optics delivering the beam to the material to be processed and control electronics of the application system. The laser head and system electronics are linked with an interface protocol. Any active devices contained in the laser head and its electronics are desired to be controlled by the system electronics. The beam path control from the laser head to the material to be processed is actively controlled via devices incorporated into the laser head.

The parameters determining the beam path to the application system are the beam angle and the amount of beam shift. The combination of a beam steering device and position-sensitive can basically provide the degree of freedom for the control. Three major functional parts are required thereby: a beam positioning sensor, the active beam steering device and an electronic feedback loop.

Figure 1:
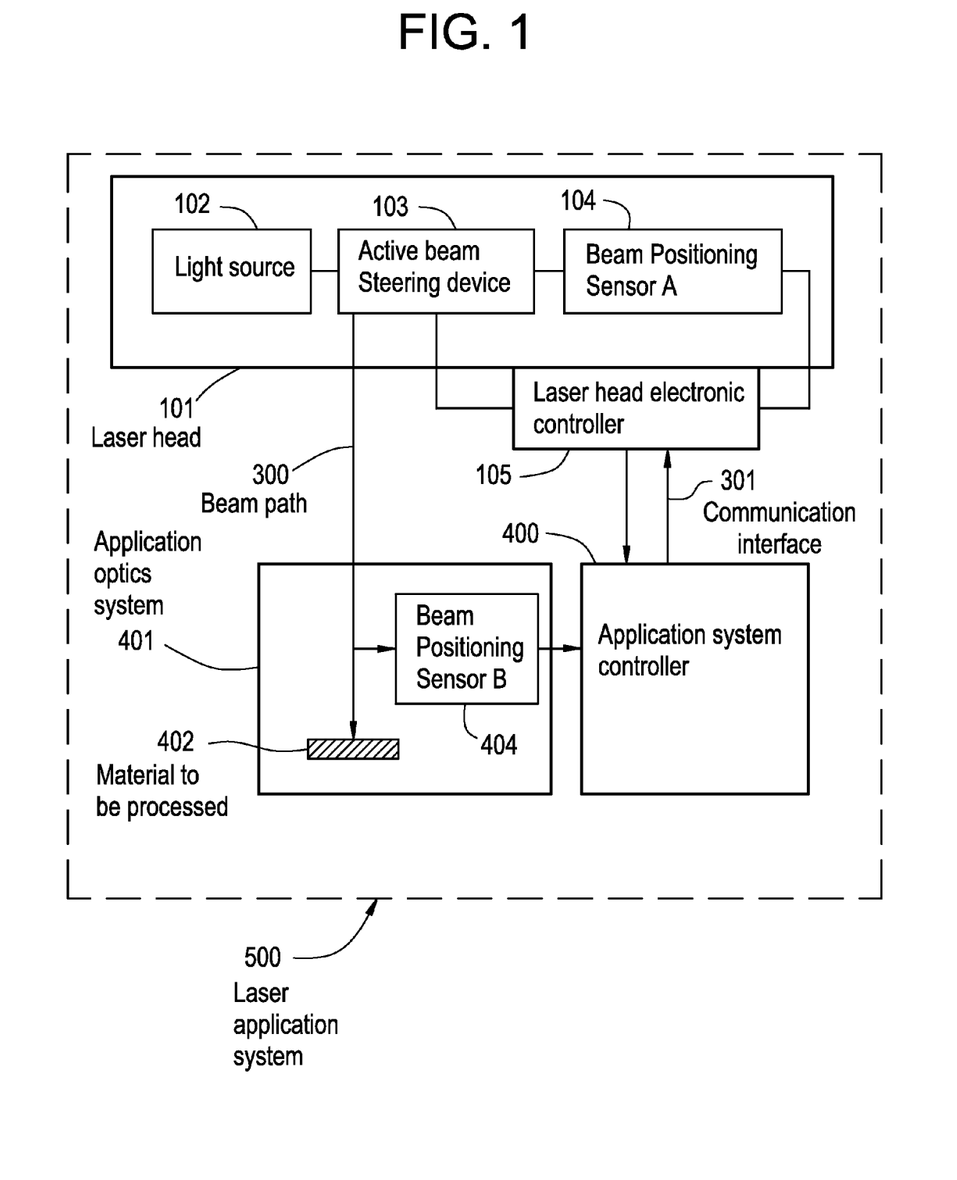
FIG. 1 is a block diagram of a laser application system comprising laser head, its electronics, delivery optics to the material to be processed and the system electronics. The laser head comprises light source (102), active beam steering device (103), beam sensor (104) and electronic controller (105). The beam positioning sensor A (104) and B (404) provides the position information caused by beam shift and angle information to the steering device via electronics. The position sensor can be placed in the laser head. However, if needed, it can be placed in the application optics system (401)

The basic method is to measure i) the beam position with respect to a pre-defined reference path with a beam positioning sensor device (104, 404) to provide the position information, and ii) to use an active beam steering device (103) which steers the beam path according to the signal fed from electronic controller (105, 400). The position sensor can be placed either in the laser head or in the application optics. The position sensor can be either a detector sensing the beam position directly on the sensor area or a device sensitive to the incidence angle.

Figure 2:
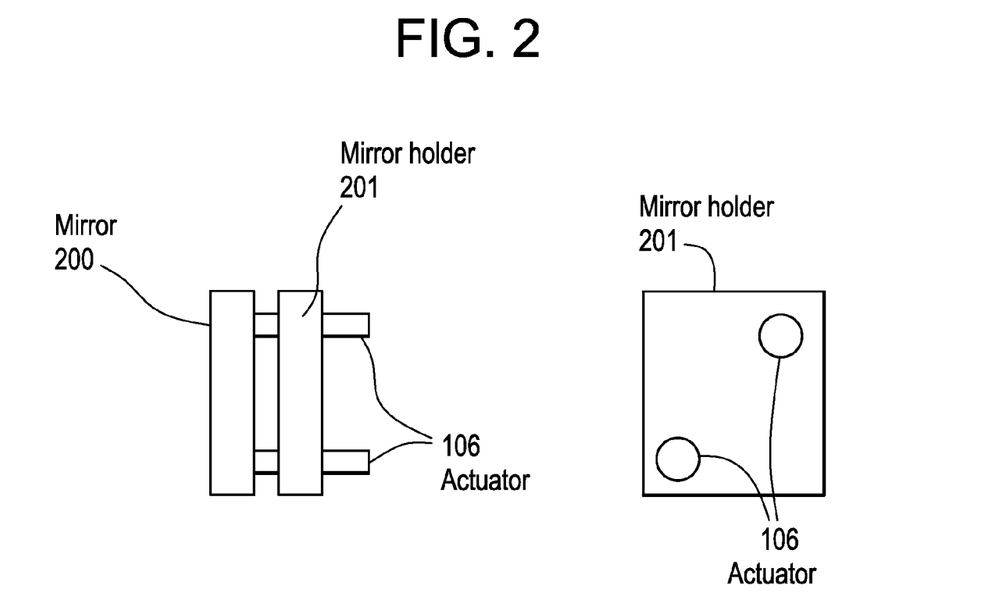
FIG. 2 is a diagram showing an exemplary device for reflective beam steering. The device comprises mirror (200), mirror holder (201) and actuator (106). The actuator tilts the mirror in order to provide angular change to the beam incident on the mirror.
Figure 3:
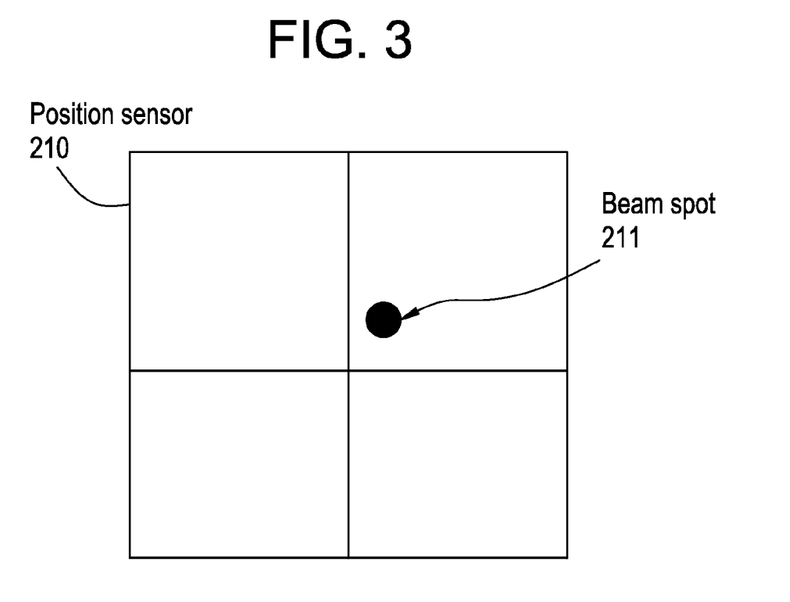

The beam path can be steered by moving the angle of a reflection mirror. The angular movement of a kinematic mirror mount can be realized by a Piezo element, galvanometric device or stepper, or dc motor driven device. This active device is referred to as an "actuator" in this disclosure, as shown in FIG. 2. The actuator located at the corner of the mirror holder (201) pushes or pulls the mirror (200) providing a tilting angle of the mirror. Incident beams on the mirror will undergo an angular change of reflection. The beam path change as a result can be detected by a position sensitive detector as shown in FIG. 3. The position sensitive sensors can detect the position of the laser spot on the detector area. The partitioning of the area allows comparison of the photo current distributed over the partitioned area, thereby determining the relative position of the spot. Two sets of steering mirrors and position sensitive detectors are required to ensure the degree of freedom of controlling beam shift and angle. For most laser application systems the angular variation is more important to be controlled than the shift due to commonly used focusing optics being relatively insensitive to beam shift.

In order to achieve an angular accuracy, e.g., <0.1 mrad, the choice of the steering device as well as the position sensitive sensor is important. The resolution of the steering angle limits the active control angle accuracy, while the resolution of the position on the sensor defines the angular accuracy to be monitored. The limitation of commonly used position sensitive sensors is the beam spot size upon the sensor area. Thus reduced spot size (211) on the sensor (210) provides better position accuracy, thereby better angular accuracy, than a large spot. One way to reduce the spot size is to demagnify the incident beam onto the sensor using lenses. The spot size decreases while angular sensitivity increases by the demagnification. The geometric limitation of implementing such demagnifier can be an issue depending on the application and space allowed in the laser head as well as in the system optics.

Figure 4:
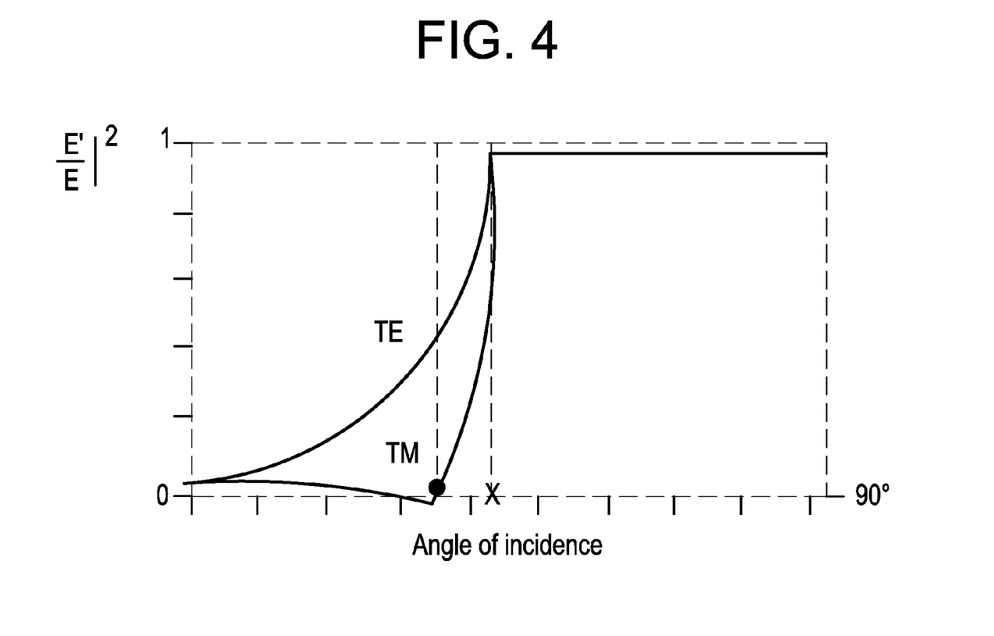
FIG. 4 shows the internal reflectance as a function of the incidence angle of beam in a medium for TE (s-polarization) and TM (p-polarization). The cross-marked angle corresponds to the critical angle for total internal reflection and the filled dot angle corresponds to the Brewster angle.

An alternative which realizes the required angular sensitivity within a limited space with a compactly packaged form exploits the kink in the internal reflectance at the critical angle. FIG. 4 shows theoretical curves (Introduction to Modern Optics, G. R. Fowles, (Holt, Rinehart and Winston, 1975), $2^{nd}$ ed, pp. 45) for the internal reflectance for TE (s-polarization) and TM (p-polarization) light as a function of the incident angle of a beam at the interface between media from a high to low refractive index. Basically, an infinitesimally small incidence angle variation around the critical angle will result in a sharp variation in the total internal reflection, or leakage light or transmitted light.

Figure 5:
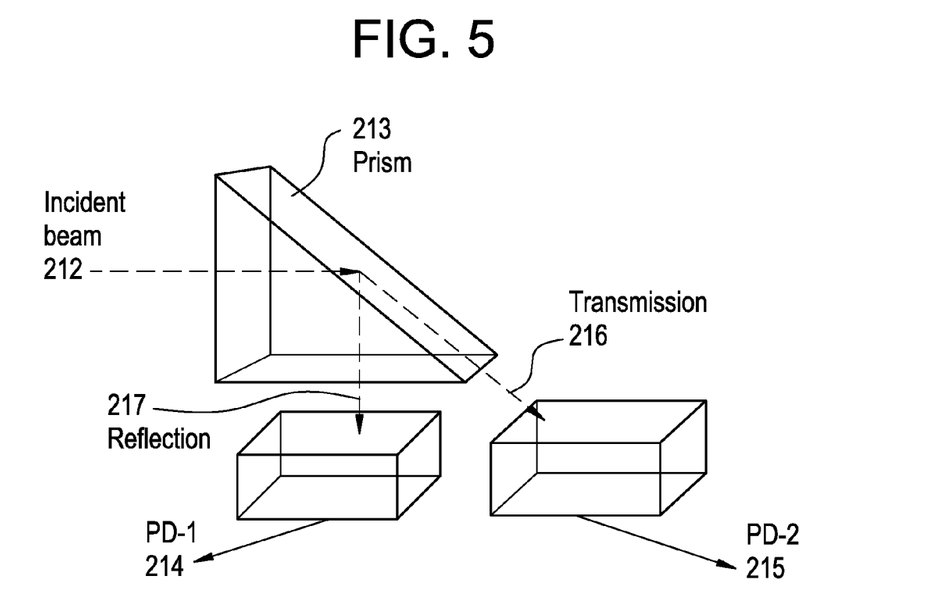
FIG. 5 shows the concept of measuring angular beam movement using the internal total reflection of a prism (213). Incident beam (212) undergoes total internal reflection in the prism hitting photodiode 1 (214) and the leakage transmission is detected by photodiode 2 (215).

FIG. 5 shows a device measuring reflected (217) and transmitted (216) light out of a prism (213) where the internal reflection angle is set around the critical angle. The measured light by PD1 (214) and PD2 (215) can be processed independently.

Figure 6:
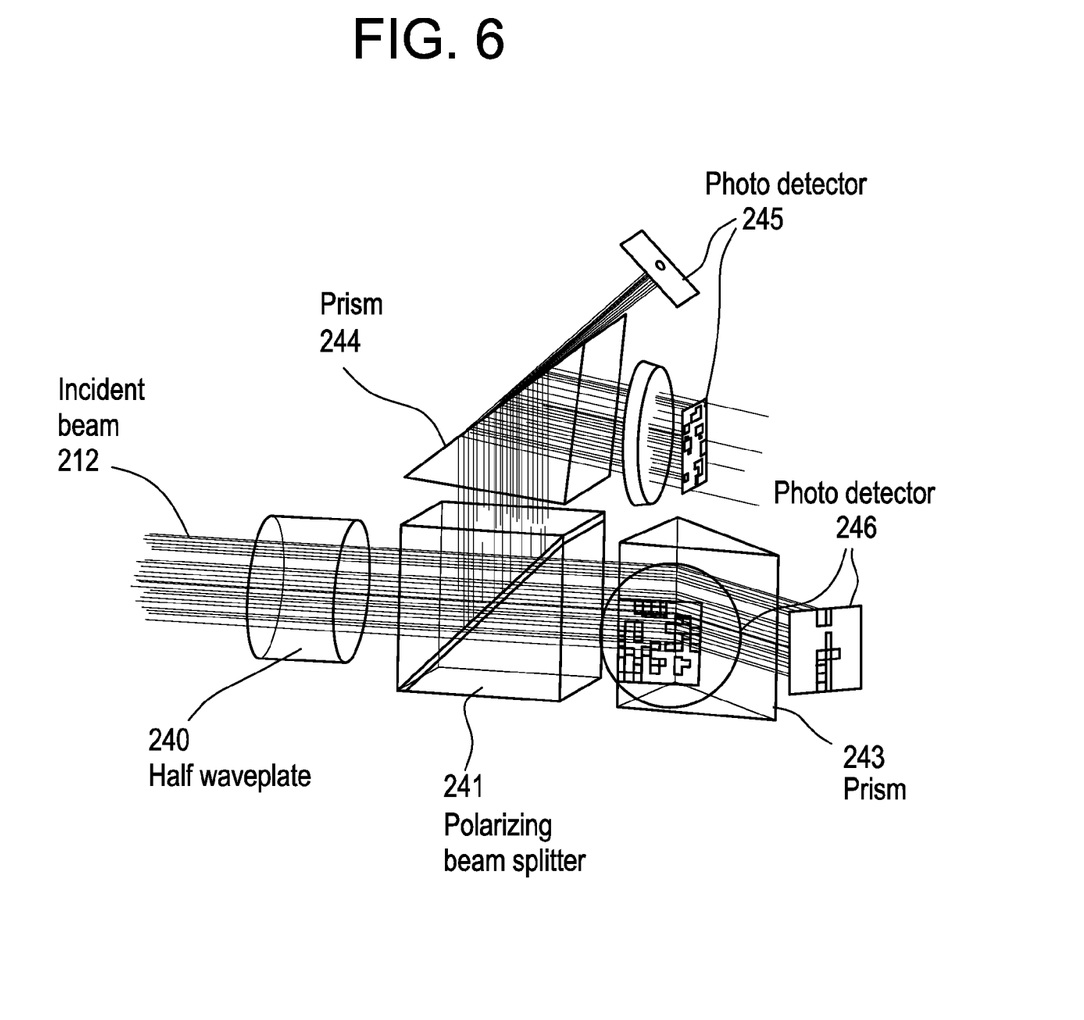

The lateral and vertical direction of the incidence angle can be measured in a compact configuration by splitting the beam into two paths. FIG. 6 shows an example where a polarizing beam splitter (241) has been used to split the beam toward two prisms (243, 244). Beams of both polarization states undergo total internal reflection in the prism and the reflected or/and transmitted light is measured by photo detectors (245, 246). The amount of light in each polarization is adjusted by a half waveplate (240) in front of the beam splitter. The splitting beam in FIG. 6 does not necessarily require being polarization dependent. A beam splitter can be used in combination with variable attenuators for the adjustment of optical power onto photodetectors.

Figure 7:
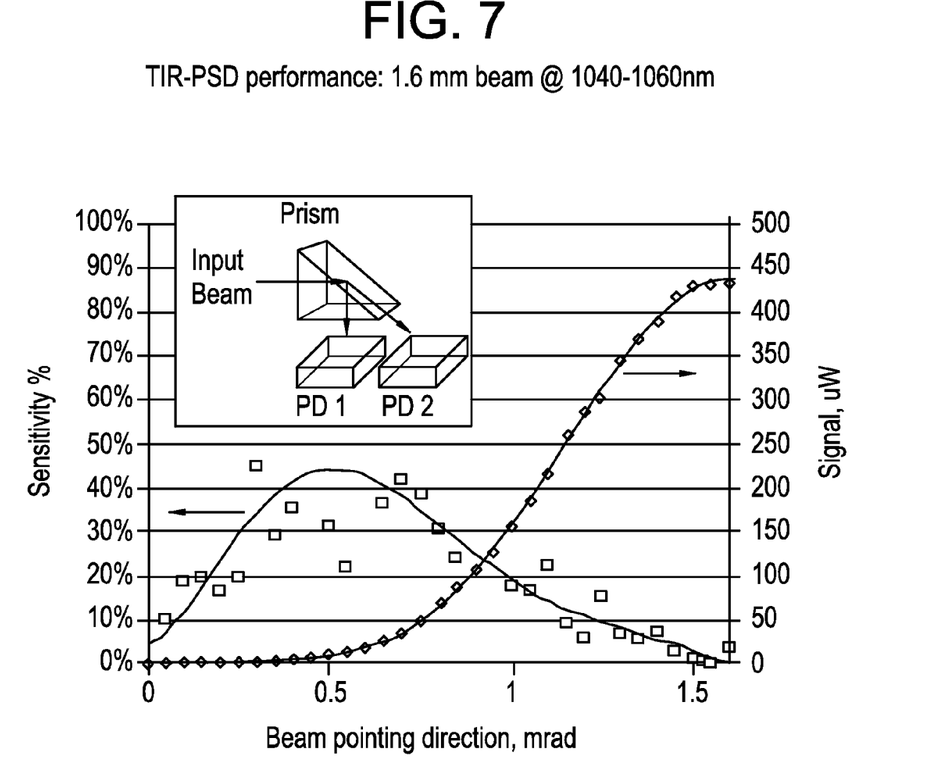
FIG. 7 is a plot showing measurement results of the angular sensitivity of the exemplary device in FIG. 5. The increase of photo current of photodiode 2 (PD2) is shown on the right hand axis while the left hand axis shows the angular sensitivity in photo current change.

FIG. 7 demonstrates the angular sensitivity of the exemplary device of FIG. 5. The transmitted light or leakage light has been measured by a photo diode, plotted on the right hand axis as photo current. The prism is tilted until a very weak leaking of light through, e.g., the hypotenuse of the prism, due to breakdown of the total internal reflection condition, appears in the direction of photodiode PD2. The increase of leakage light is obvious as the incident angle deviates from the critical angle to a smaller angle. The left hand axis shows the sensitivity, estimated relative change in photo current between successive measurement points of at 50 microradian step, which is equivalent to the derivative of the signal curve.

If an optical beam was monochromatic and had zero divergence, the total internal reflection would have a binary (infinitely sharp step-function) response. In reality, the response is smoother due to beam divergence and finite wavelength distribution. For example, an ideal Gaussian beam at 1040-1060 nm, 1.6 mm in diameter, would have a divergence of 0.825 mrad (full-angle) which would be further broadened, due to wavelength dispersion in the prism material, by an additional 0.235 mrad which gives 1.06 mrad. Indeed, the width of the curves is close to 1mrad. Maximum relative signal increase was observed at smaller optical signal. At the peak near 0.5 mrad, for example, the sensitivity is such that 1 microradian angular change corresponds to a 1% relative signal increase from that level.

The attractiveness of this concept is its sensitivity, simplicity, stability, and very compact size. The entire beam pointing sensor can be made only a few cm long. Two units (or one combined unit) would be required to stabilize X and Y angles. The detector can be directly mounted onto the prism surface for further compactness and stability.

For diverging beam and a broadband spectrum, as indicated above, the sharp transition is not fully realized. An alternative method is to increase the power measurement sensitivity of the sensor to pick up minute changes in reflection or transmission. The measurement accuracy from measuring optical power of a laser is mostly limited by the power fluctuation of the laser. A 1% level of accuracy can be challenging.

Figure 8:
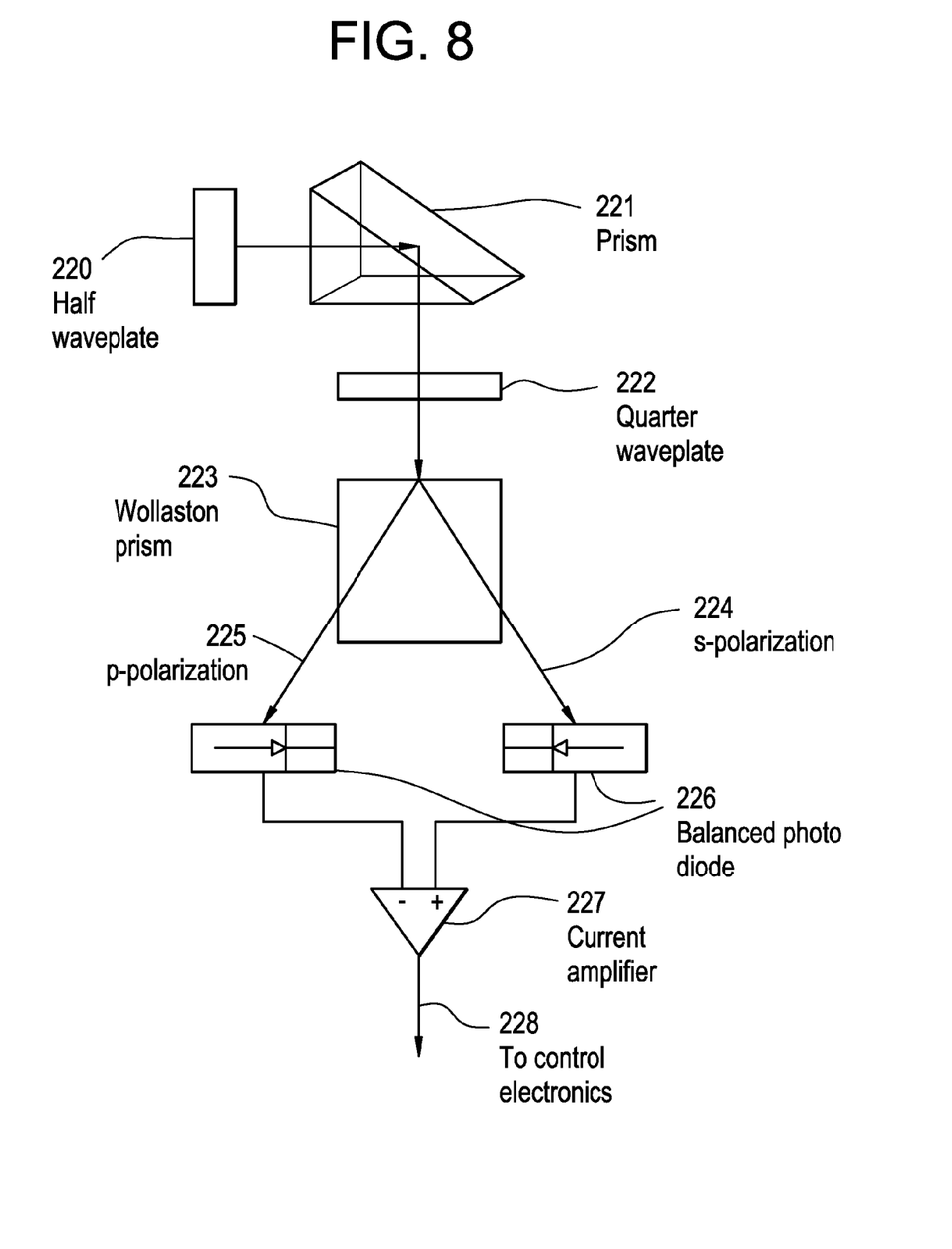
FIG. 8 is a diagram of an exemplary embodiment of the beam angle-sensitive optical device using polarization dependent total internal reflection. The polarization of the incident beam is adjusted by waveplates (220) and (222), so that the s- (224) and p-components (225) of the reflected beam are balanced onto photo detector (226). The photo signal from the balanced detector is compared in a differential current amplifier (227) and consequently sent to the control electronics (228).

An alternative method is to use the polarization stability of a laser. The polarization degree of, e.g., linear polarized light, of 30~40 dB is easily achieved by polarizing optics in the laser head. FIG. 8 shows a schematic of the measurement of angular variation of a beam in dependency of polarization. The angle dependency of the measurement originates basically from the significant difference in reflectance and in the slope of reflectance between TE and TM in FIG. 4. This method is applicable for an internal refraction angle below the critical angle. The external reflectance has similar differences between polarization states, while the difference is less than in the case of internal reflection. Basically, any polarization sensitive angular response of a medium is subject to this concept, depending on accuracy required.

The internal reflection of the incident beam is separated into TE and TM waves using a Wollaston prism (223) or any polarization splitter. Both beams hit independently onto two balanced photodiodes (226), where the photo signal is balanced to "zero" in a differential amplifier (227). The half waveplate (220) and quarter waveplate (222) can be adjusted to achieve the balanced "zero" level. Usually, depending on the polarizer used in laser head before hitting the prism, the dynamic range of detectable "zero" level can be easily <−40 dB, which corresponds to a sub-microradian angle resolution of the incident beam.

Figure 9:
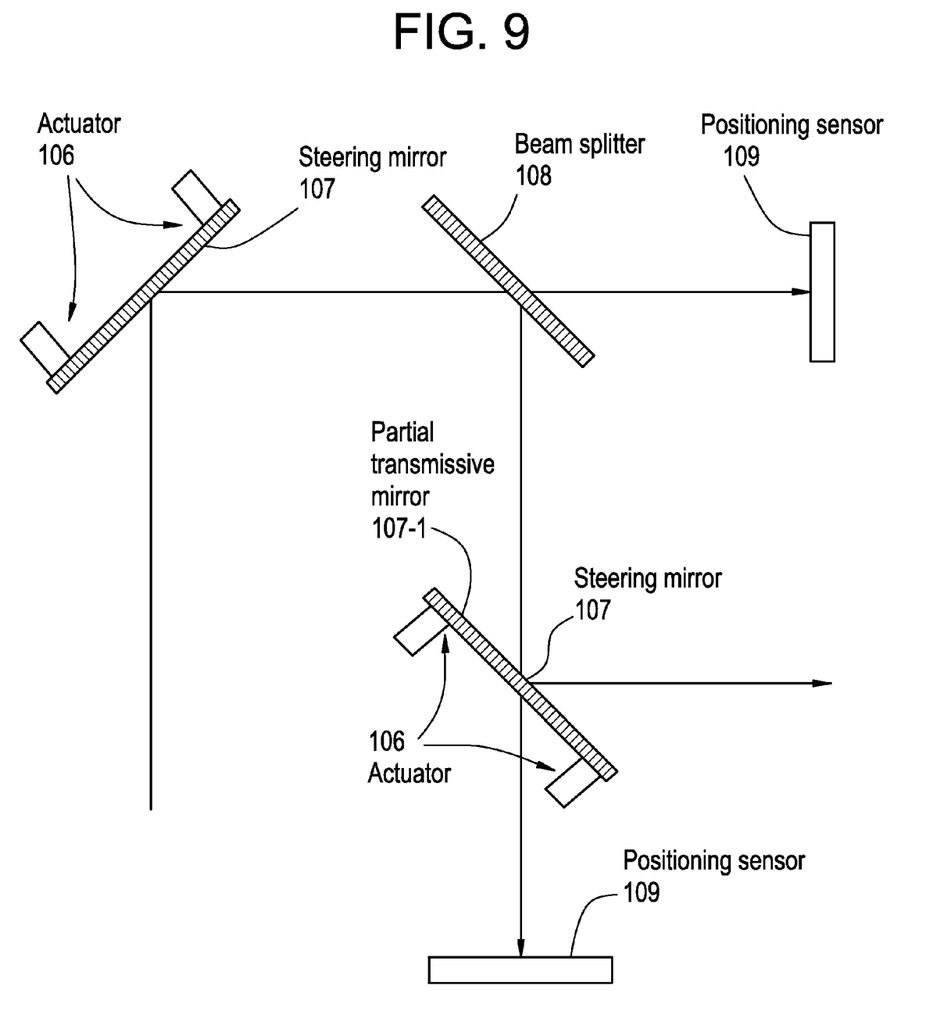
FIG. 9 is a diagram of another exemplary embodiment with a pair of steering mirrors and positioning sensor. The actuators and position sensor are linked to the electronic controller (105) where the data from the sensor is processed and a command signal is fed to the actuator driver, which controls the motion of the actuators.
Figure 10:
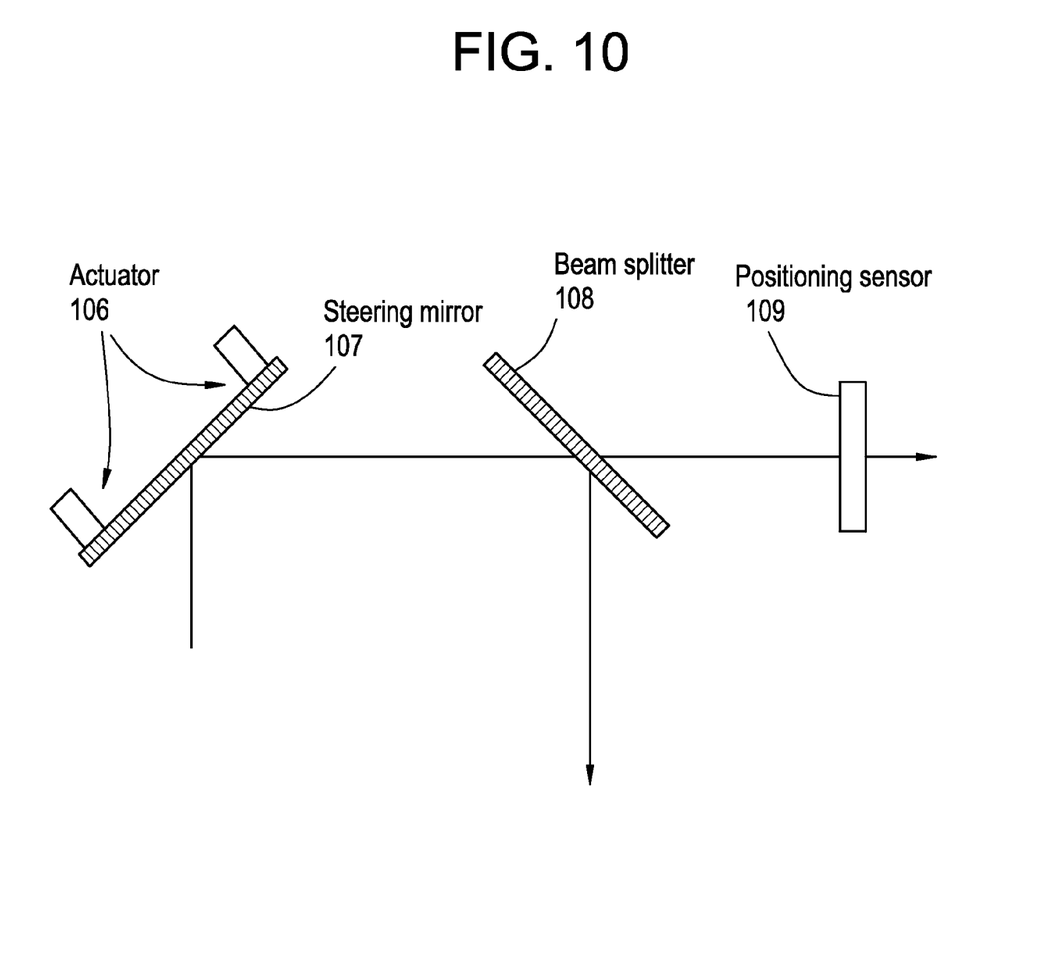
FIG. 10 is a diagram of an exemplary embodiment of an active beam stabilization method using one steering mirror (107) and position sensor (109). The actuators (106) are mounted on the mirror mount. Beam splitter (108) provides light onto the position sensor. The actuators and position sensor are linked to the electronic controller (105) where the data from the sensor is processed and a command signal is fed to the actuator driver, which controls the motion of the actuators.

The full control of beam shift and angular direction is achieved by a pair of steering mirrors and position sensitive sensors as shown in FIG. 9. A beam splitter (108) and partial mirror (107-1) are used thereby to tap the beam geometrically. As shown in FIG. 10, the angular control of beam direction can be realized by one steering mirror and sensor. The position sensor can be a quadrant detector or any angle sensitive device as described earlier, with corresponding electronic signal output.

An example of implementation of the invention is in the free-space pulse compressor area of an ultrafast laser. For most ultrashort pulse lasers the underlying technology is chirped pulse amplification, in order to limit phenomena originating from optical nonlinearity. Furthermore, all optical interfaces can be protected from being damaged by highly intense ultrashort pulses in the amplifier using this technology. This can be realized by pre-chirping the pulse before the major amplifier stage to be sufficiently long in the time domain, and then recompressing the pulse after amplification. The pulse recompression can be realized by a free-space compressor stage comprising diffractive elements such as gratings. Prisms or any dispersive elements can be used in the compressor as long as the dispersive property is proper for the pulse recompression.

Figure 11:
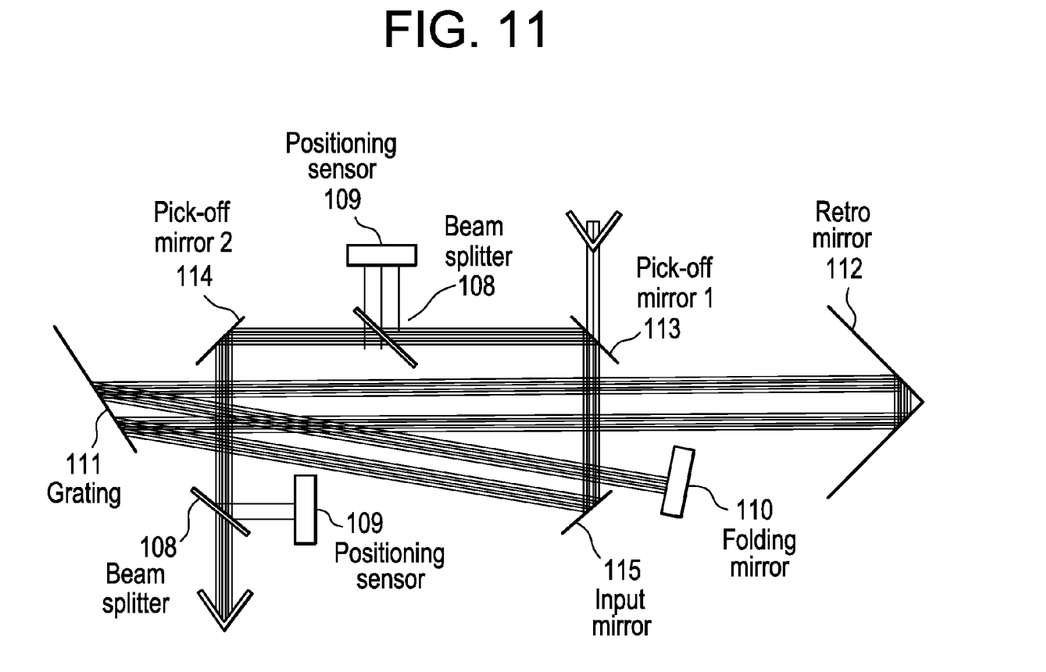

FIG. 11 shows a diagram of a typical schematic of a pulse compressor packaged in the laser head. Any of the mirrors in the compressor can be used for steering the beam path. Actuators can be mounted on one or multiple mirror(s), such as input mirror (115), pick-off mirror 1,2 (113,114) or on folding mirror (110). Controlling the folding mirror (110) is of special advantage, since the beam propagates in full reversal experiencing the same optics when reflected by this mirror. A steering mirror with actuators can be integrated with the folding mirror (110).

The example above can be extended to any free-space optics included in the laser head. Furthermore, the means of steering beam path are not restricted to mirrors. Any transmissive refractive optics giving rise to variation of beam path can be used.

After the laser head is incorporated into an application system the beam steering in the laser head can follow the command protocol from the application system by a proper interface between them.

What is claimed is:

1. A laser-based material processing system, comprising:
   a pulsed laser amplification system having a laser head and a head end, said amplification system comprising a source of laser pulses, and an optical amplifier to amplify said pulses;
   a pulse stretcher to stretch a pulse before amplification with said optical amplifier, and a pulse compressor to reduce a width of an amplified pulse;
   a beam steering device disposed between an output of said optical amplifier and said head end, said beam steering device configured in such a way that an amplified output beam being emitted from said head end is stabilized in one or more of position and angle by said beam steering device, said beam steering device being configured to receive one or more feedback signals from an end-use apparatus disposed beyond said head end, said one or more signals being derived from at least one position sensitive sensor;
   an end-use apparatus to which said pulsed laser amplification system is optically coupled, said end-use apparatus being disposed beyond said head end, said end use apparatus comprising a system controller to receive an output derived from said position-sensitive sensor and to generate a command for said controlling of said beam steering device, said command being generated in said end use apparatus and communicated to said beam steering device through a communication interface between said end use apparatus and said laser head, wherein said laser-based material processing system is configured such that said beam steering device is controllable by said system controller; and
   a laser controller disposed between said end-use apparatus and said beam steering device, said laser controller being in communication with said end-use apparatus and operatively connected to said at least one position sensor and said beam steering device, said beam steering device being coordinated with commands from said system controller and said laser controller.

2. The system of claim 1, wherein said pulse stretcher provides a sufficiently long pulse width to limit non-linearity in said pulsed laser amplification system.

3. The system of claim 1, further comprising at least one position-sensitive sensor disposed within said end-use apparatus.

4. The system of claim 1, wherein said source of laser pulses comprises a fiber-based laser.

5. The system as claimed in claim 1, further comprising: beam delivery optics that receives an amplified output pulse from said amplification system, and delivers said pulse to said material to be processed.

6. The system as claimed in claim 1, wherein said compressor comprises at least one free-space optical element, said beam steering device and said free-space optical element disposed in a common optical path, said compressor and said beam steering device configured in such a way that a pulse incident on said beam steering device along said common optical path is redirected to propagate along a reversed common optical path toward said free-space optical element.

7. The system as claimed in claim 1, wherein at least one amplified and compressed pulse comprises an ultrashort pulse having a pulse width less than 100 ps.

8. The system as claimed in claim 1, wherein said position-sensitive sensor comprises an optical element having a critical angle, and being positioned so as to normally receive an amplified beam output at or around said critical angle.

9. A laser-based material processing system, comprising:
   a pulsed laser amplification system having a laser head and a head end, said pulsed laser amplification system comprising a source of laser pulses, and an optical amplifier to amplify said pulses, wherein said pulsed laser amplification system generates at least one ultrashort output pulse having a pulse width less than 100 ps;
   a beam steering device disposed between an output of said optical amplifier and said head end, said beam steering device configured in such a way that an output beam being emitted from said head end is stabilized in one or more of position and angle by said beam steering device, said beam steering device being configured to receive one or more feedback signals from an end-use apparatus disposed beyond said head end, said one or more signals being derived from at least one position sensitive sensor;
   an end-use apparatus to which said pulsed laser amplification system is optically coupled, said end-use apparatus being disposed beyond said head end, said end use apparatus comprising a system controller to receive an output derived from said position-sensitive sensor and to generate a command for said controlling of said beam steering device, said command being generated in said end use apparatus and communicated to said beam steering device through a communication interface between said end use apparatus and said laser head, wherein said laser-based material processing system is configured such that said beam steering device is controllable by said system controller; and
   a laser controller disposed between said end-use apparatus and said beam steering device, said laser controller being in communication with said end-use apparatus and operatively connected to said at least one position sensor and said beam steering device, said beam steering device being coordinated with commands from said system controller and said laser controller.

10. The system of claim 9, said pulsed laser amplification system comprising a pulse stretcher to stretch a pulse before amplification with said optical amplifier, and a pulse compressor to reduce a width of an amplified pulse, wherein said pulse stretcher provides a sufficiently long pulse width to limit non-linearity in said pulsed laser amplification system.

11. The system as claimed in claim 10, wherein said compressor comprises at least one free-space optical element, said beam steering device and said free-space optical element disposed in a common optical path, said compressor and said beam steering device configured in such a way that a pulse incident on said beam steering device along said common optical path is redirected to propagate along a reversed common optical path toward said free-space optical element.

12. The system of claim 9, further comprising at least one position-sensitive sensor disposed within said end-use apparatus.

13. The system of claim 9, wherein said source of laser pulses comprises a fiber- based laser.

14. The system as claimed in claim 9, further comprising: beam delivery optics that receives an output pulse from said pulsed laser amplification system, and delivers at least one output pulse to said material to be processed.

15. The system as claimed in claim 9, wherein said position-sensitive sensor comprises an optical element having a critical angle, and being positioned so as to normally receive an amplified beam output at or around said critical angle.

* * * * *